US010741202B2

(12) United States Patent
Ho et al.

(10) Patent No.: US 10,741,202 B2
(45) Date of Patent: Aug. 11, 2020

(54) MAMR WRITER WITH LOW RESISTANCE MAMR STACK

(71) Applicant: Western Digital Technologies, Inc., San Jose, CA (US)

(72) Inventors: Michael Kuok San Ho, Emerald Hills, CA (US); Yunfei Ding, Fremont, CA (US); Zhigang Bai, Fremont, CA (US); Yaguang Wei, Pleasanton, CA (US); Terence Lam, Cupertino, CA (US); Goncalo Baiao de Albuquerque, San Jose, CA (US); Xinjiang Shen, Fremont, CA (US); Feng Q. Liu, San Ramon, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/276,500

(22) Filed: Feb. 14, 2019

(65) Prior Publication Data
US 2019/0251992 A1   Aug. 15, 2019

Related U.S. Application Data

(63) Continuation of application No. 16/017,909, filed on Jun. 25, 2018, now abandoned.
(Continued)

(51) Int. Cl.
*G11B 5/235* (2006.01)
*G11B 5/31* (2006.01)
(Continued)

(52) U.S. Cl.
CPC ............ *G11B 5/235* (2013.01); *G11B 5/1278* (2013.01); *G11B 5/314* (2013.01); *G11B 5/3146* (2013.01);
(Continued)

(58) Field of Classification Search
None
See application file for complete search history.

(56) References Cited

U.S. PATENT DOCUMENTS 8,184,411 B2   5/2012   Zhang et al.
8,355,222 B2   1/2013   Mino et al.
(Continued)

FOREIGN PATENT DOCUMENTS

CN   104835510 B   11/2017
JP   2013251042 A   12/2013
WO   2015126326 A1   8/2015

OTHER PUBLICATIONS

Mallory, Mike et al; "Head and Media Challenges for 3 Tb/in2 Microwave-Assisted Magnetic Recording"; IEEE Transactions on Magnetics, vol. 50, No. 7, Jul. 2014 (8 pages).
(Continued)

*Primary Examiner* — Craig A. Renner
(74) *Attorney, Agent, or Firm* — Patterson & Sheridan, LLP; Steven H. Versteeg

(57) ABSTRACT

The present disclosure generally relates to a magnetic media drive employing a magnetic recording head. The head includes a main pole at a media facing surface (MFS), a trailing shield at the MFS, and a MAMR stack disposed between the main pole and the trailing shield at the MFS. The MAMR stack includes a seed layer and at least one magnetic layer. The seed layer is fabricated from a thermally conductive material having electrical resistivity lower than that of the main pole. The seed layer has a stripe height greater than a stripe height of the at least one magnetic layer. With the extended seed layer, the bias current from the trailing shield to the main pole spreads further away from the MFS along the extended seed layer before flowing into the
(Continued)

main pole, reducing temperature rise at or near the MAMR stack, leading to improved write head reliability.

16 Claims, 6 Drawing Sheets

Related U.S. Application Data

(60) Provisional application No. 62/606,142, filed on Oct. 5, 2017.

(51) Int. Cl.
   *G11B 5/127* (2006.01)
   *G11B 5/00* (2006.01)

(52) U.S. Cl.
   CPC ............... *G11B 2005/0008* (2013.01); *G11B 2005/0024* (2013.01)

(56) References Cited

U.S. PATENT DOCUMENTS

| | | | |
|---|---|---|---|
| 8,462,461 B2 | 6/2013 | Braganca et al. | |
| 8,472,135 B1 | 6/2013 | Kusukawa et al. | |
| 8,498,079 B1 | 7/2013 | Song et al. | |
| 8,582,240 B1 | 11/2013 | Chen et al. | |
| 8,724,259 B1 | 5/2014 | Liu et al. | |
| 8,760,779 B2 | 6/2014 | Johns et al. | |
| 8,780,499 B2 | 7/2014 | Hsiao et al. | |
| 8,837,086 B2 | 9/2014 | Udo et al. | |
| 8,837,088 B1 | 9/2014 | Kimura et al. | |
| 8,920,947 B2 | 12/2014 | Zhang et al. | |
| 8,937,789 B2 | 1/2015 | Watanabe et al. | |
| 8,946,834 B2 | 2/2015 | Wang et al. | |
| 8,995,088 B1 | 3/2015 | Boone et al. | |
| 9,001,465 B1* | 4/2015 | Shimizu et al. | G11B 5/3146 360/125.3 |
| 9,053,721 B1 | 6/2015 | Ahn et al. | |
| 9,082,960 B2 | 7/2015 | Jan et al. | |
| 9,093,102 B1 | 7/2015 | Gong et al. | |
| 9,117,474 B1 | 8/2015 | Contreras et al. | |
| 9,202,484 B1 | 12/2015 | Watanabe et al. | |
| 9,222,994 B2 | 12/2015 | Zhou et al. | |
| 9,230,571 B1 | 1/2016 | Chen et al. | |
| 9,275,672 B2 | 3/2016 | Shiroishi et al. | |
| 9,349,396 B2 | 5/2016 | Zhang et al. | |
| 9,368,135 B2 | 6/2016 | Gao | |
| 9,881,637 B1 | 1/2018 | Wilson et al. | |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2011/0216435 A1* | 9/2011 | Shiimoto et al. | G11B 5/02 360/59 |
| 2012/0212855 A1 | 8/2012 | Sasaki et al. | |
| 2012/0262821 A1* | 10/2012 | Taguchi et al. | G11B 5/235 360/119.02 |
| 2012/0275061 A1* | 11/2012 | Takagishi et al. | G11B 5/3146 360/125.03 |
| 2013/0063837 A1* | 3/2013 | Udo et al. | G11B 5/3146 360/125.29 |
| 2013/0250456 A1 | 9/2013 | Yamada et al. | |
| 2013/0271869 A1* | 10/2013 | Taguchi et al. | G11B 5/3146 360/125.3 |
| 2014/0139952 A1 | 5/2014 | Takeo et al. | |
| 2014/0177100 A1 | 6/2014 | Sugiyama et al. | |
| 2014/0211340 A1* | 7/2014 | Sugiura | G11B 5/3133 360/97.11 |
| 2015/0228296 A1* | 8/2015 | Taguchi | G11B 5/3146 360/123.12 |
| 2016/0027455 A1 | 1/2016 | Kudo et al. | |
| 2016/0314809 A1* | 10/2016 | Taguchi et al. | G11B 5/314 |
| 2017/0076742 A1 | 3/2017 | Tang et al. | |
| 2017/0092304 A1* | 3/2017 | Koizunni et al. | G11B 5/3146 |
| 2017/0186450 A1* | 6/2017 | Yamada et al. | G11B 5/3146 |
| 2017/0236537 A1 | 8/2017 | Murakami et al. | |
| 2018/0261241 A1* | 9/2018 | Narita et al. | G11B 5/3116 |
| 2018/0268848 A1 | 9/2018 | Narita et al. | |
| 2019/0088274 A1 | 3/2019 | Narita et al. | |

OTHER PUBLICATIONS

International Search Report issued in corresponding International Application No. PCT/US2018/052714, dated Jan. 16, 2019 (3 pages).

Written Opinion issued in corresponding International Patent Application No. PCT/US2018/052714, dated Jan. 16, 2019 (6 pages).

Tang, et al. "Narrow Track Confinement by AC Field Generation Layer in Microwave Assisted Magnetic Recording," IEEE Transactions on Magnetics; vol. 44, Issue 11; dated Dec. 16, 2008; 3 total pages.

Watanabe, et al. "Oscillation Stability of a Small Size Spin Torque Oscillator for MAMR," IEEE Transactions on Magnetics; vol. 49, Issue 7; dated Jul. 15, 2013; 4 total pages.

Graziosi, et al. "Seed Layer Technique for High Quality Epitaxial Manganite Films," AIP Advances 6; dated 2016; 9 total pages.

\* cited by examiner

MAMR WRITER WITH LOW RESISTANCE MAMR STACK

CROSS-REFERENCE TO RELATED APPLICATIONS

This application is a continuation of co-pending U.S. patent application Ser. No. 16/017,909, filed Jun. 25, 2018, which claims benefit of U.S. Provisional Application Ser. No. 62/606,142, filed on Oct. 5, 2017. Each of the aforementioned related patent applications is herein incorporated by reference.

BACKGROUND

Field of the Disclosure

Embodiments of the present disclosure generally relate to data storage devices, and more specifically, to a magnetic media drive employing a magnetic recording head.

Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a MAMR stack disposed between the trailing shield and the main pole to improve write field and/or field gradient, leading to better areal density capability (ADC). The MAMR stack may include a seed layer and at least one magnetic layer, such as a spin torque layer (STL) that is magnetized by a bias current during operation. Alternatively, the MAMR stack may include spin torque oscillator (STO) for generating a microwave (high frequency AC magnetic field). When a bias current is conducted to the STO from the main pole, the STO oscillates and provides an AC magnetic field to the recording medium. The AC magnetic field may reduce the coercive force of the recording medium, thus high quality recording by MAMR may be achieved. Typically the STO includes a seed layer, a spin polarization layer (SPL), a field generation layer (FGL) and an interlayer disposed between the SPL and the FGL.

However, Joule heating induced by the bias current can cause a significant temperature rise at and near the MAMR stack, causing degradation of the MAMR stack and/or the main pole and the trailing shield in the vicinity of the MAMR stack. Therefore, there is a need in the art for an improved data storage device.

SUMMARY OF THE DISCLOSURE

The present disclosure generally relates to a magnetic media drive employing a magnetic recording head. The head includes a main pole at a media facing surface (MFS), a trailing shield at the MFS, and a MAMR stack disposed between the main pole and the trailing shield at the MFS. The MAMR stack includes a seed layer and at least one magnetic layer. The seed layer is fabricated from a thermally conductive material having electrical resistivity lower than that of the main pole. The seed layer has a stripe height greater than a stripe height of the at least one magnetic layer. With the extended seed layer, the bias current from the trailing shield to the main pole spreads further away from the MFS along the extended seed layer before flowing into the main pole, reducing temperature rise at or near the MAMR stack, leading to improved write head reliability.

In one embodiment, a magnetic recording head includes a main pole, a trailing shield, and a stack disposed between the main pole and the trailing shield, wherein the stack includes a seed layer having a first stripe height and at least one magnetic layer having a second stripe height, and wherein the first stripe height is greater than the second stripe height.

In another embodiment, a magnetic recording head includes a main pole, a trailing shield, a stack disposed between the main pole and the trailing shield, wherein the stack includes a seed layer having a first portion and a second portion, and at least one magnetic layer disposed on the first portion. The magnetic recording head further includes a dielectric material disposed on the second portion of the seed layer.

In another embodiment, a data storage device includes a magnetic write head having a trailing shield, a main pole, a stack disposed between the main pole and the trailing shield, wherein the stack includes a magnetic layer having a first stripe height, and a current blocking layer disposed between the stack and the main pole at a media facing surface, wherein the current blocking layer has a second stripe height less than the first stripe height.

In another embodiment, a magnetic recording head includes a main pole, a stack coupled to the main pole, and means for directing a bias current away from the main pole at a media facing surface.

In another embodiment, a magnetic recording head is disclosed comprising a main pole, a trailing shield and a stack disposed between the main pole and the trailing shield, wherein the stack includes a seed layer having a first stripe height and at least one magnetic layer having a second stripe height, and wherein the first stripe height is equal to the second stripe height.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a magnetic media drive employing a magnetic recording head. The head includes a main pole at a media facing surface (MFS), a trailing shield at the MFS, and a MAMR stack disposed between the main pole and the trailing shield at the MFS. The MAMR stack includes a seed layer and at least one magnetic layer. The seed layer is fabricated from a thermally conductive material having electrical resistivity lower than that of the main pole. The seed layer has a stripe height greater than a stripe height of the at least one magnetic layer. With the extended seed layer, the bias current from the trailing shield to the main pole spreads further away from the MFS along the extended seed layer before flowing into the main pole, reducing temperature rise at or near the MAMR stack, leading to improved write head reliability.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
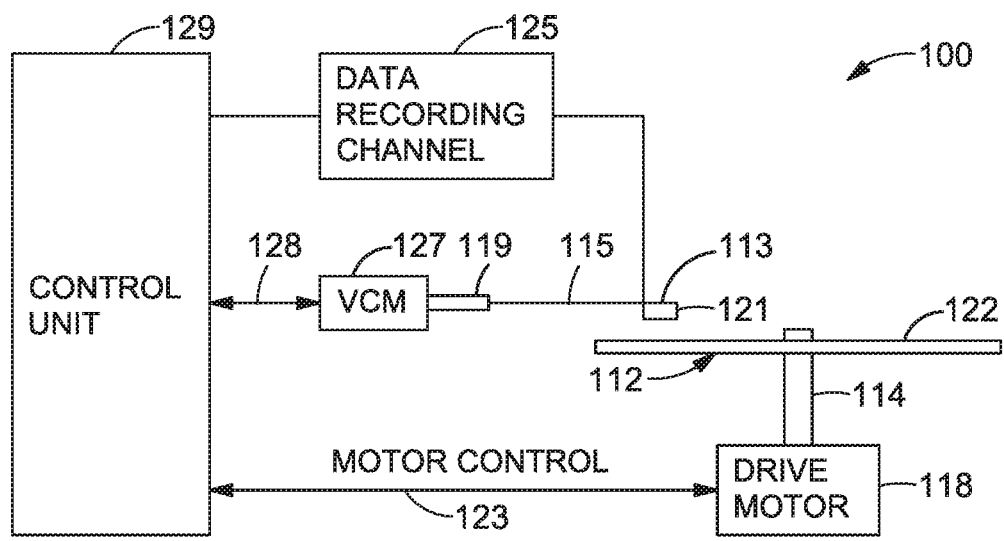
FIG. 1 is a schematic illustration of a magnetic media device according to one embodiment disclosed herein.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a MAMR stack disposed between a trailing shield and a main pole. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
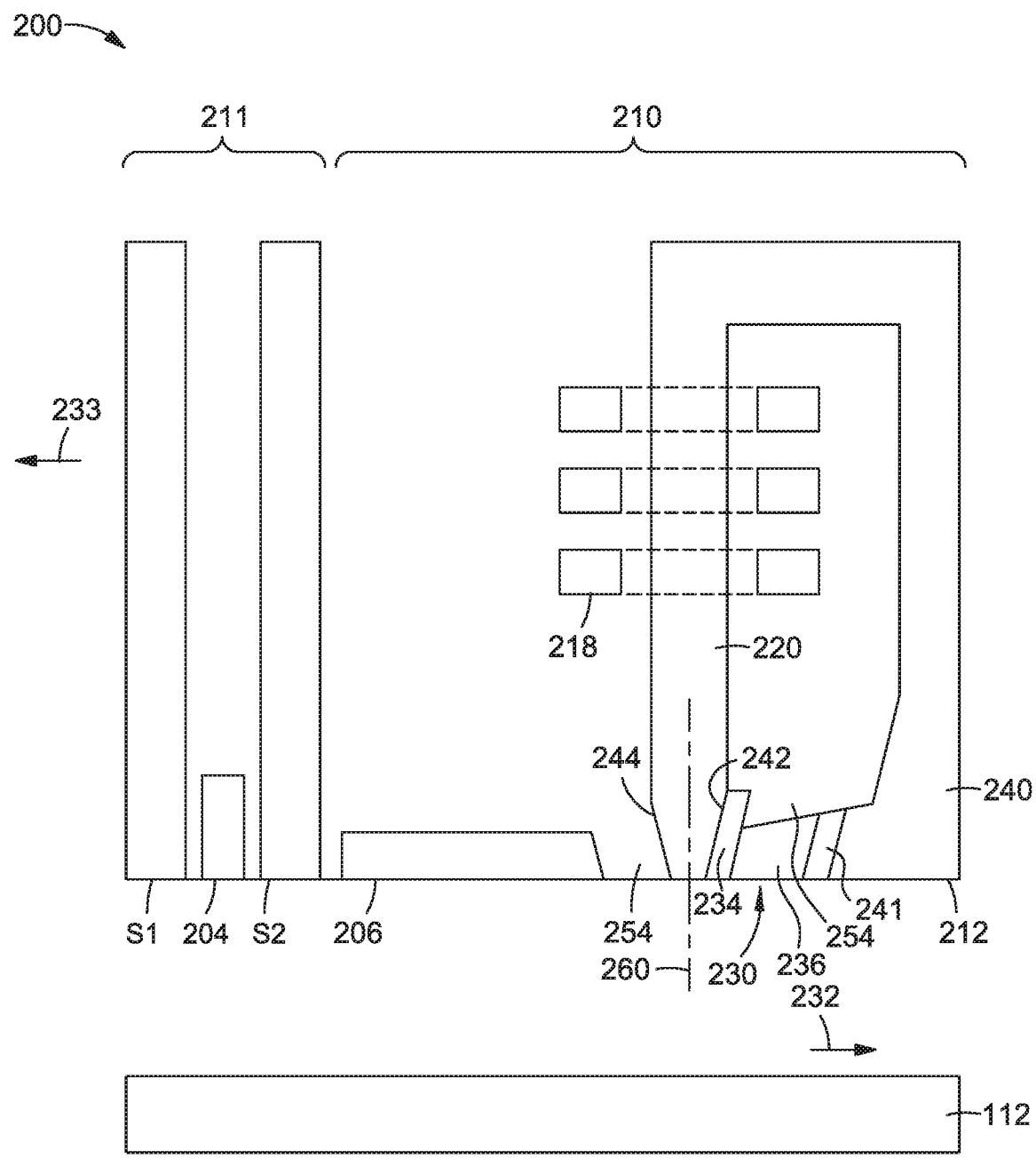
FIG. 2 is a fragmented, cross sectional side view of a read/write head facing a magnetic disk according to one embodiment disclosed herein.

FIG. 2 is a fragmented, cross sectional side view of a read/write head 200 facing the magnetic disk 112 according to one embodiment. The read/write head 200 may correspond to the magnetic head assembly 121 described in FIG. 1. The read/write head 200 includes a MFS 212, such as an air bearing surface (ABS), facing the disk 112, a magnetic write head 210, and a magnetic read head 211. As shown in FIG. 2, the magnetic disk 112 moves past the write head 210 in the direction indicated by the arrow 232 and the read/write head 200 moves in the direction indicated by the arrow 233.

In some embodiments, the magnetic read head 211 is a magnetoresistive (MR) read head that includes an MR sensing element 204 disposed between MR shields S1 and S2. In other embodiments, the magnetic read head 211 is a magnetic tunnel junction (MTJ) read head that includes a MTJ sensing device 204 disposed between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, a MAMR stack 230 disposed between the main pole 220 and the trailing shield 240, and a coil 218 that excites the main pole 220. The coil 218 may have a "pancake" structure which winds around a back-contact between the main pole 220 and the trailing shield 240, instead of a "helical" structure shown in FIG. 2. The MAMR stack 230 may be in contact with the main pole 220 and the trailing shield 240. In one embodiment, a trailing shield hot seed layer 241 is coupled to the trailing shield 240, and MAMR stack 230 is in contact with the main pole 220 and the trailing shield hot seed layer 241. A dielectric material 254 is disposed between the leading shield 206 and the main pole 220. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material such as a FeCo alloy. The leading shield 206 and the trailing shield 240 may be a magnetic material, such as NiFe alloy. The trailing shield hot seed layer 241 may include a high moment sputter material, such as FeCo, CoFeN or FeXN, where X includes at least one of Rh, Al, Ta, Zr, and Ti.

The MAMR stack 230 includes a seed layer 234 and one or more layers 236. The seed layer 234 may be a single layer or a layer stack including more than one layer. The seed layer 234 is fabricated from a thermally conductive material having electrical resistivity lower than that of the main pole 220. The seed layer 234 may be fabricated from a non-magnetic metal or alloys, such as copper (Cu), chromium (Cr), ruthenium (Ru), tungsten (W), gold (Au), silver (Ag), tin (Sn), molybdenum (Mo), iridium (Ir), platinum (Pt), or rhodium (Rh). In one embodiment, the seed layer 234 has a lower electrical resistivity than that of tantalum. In one embodiment, the one or more layers 236 include a magnetic layer, such as a STL, and a spacer layer. In one embodiment, the magnetic layer is NiFe, CoMnGe, or CoFe. The spacer layer is fabricated from a material such as Cu or AgSn. In another embodiment, the one or more layers 236 includes a first magnetic layer, such as a SPL, a second magnetic layer, such as an FGL, and an interlayer disposed between the SPL and the FGL. As shown in FIG. 2, the seed layer 234 extends further away from the MFS 212 than the one or more layers 236. The MAMR stack 230 is described in detail below.

Figure 3:
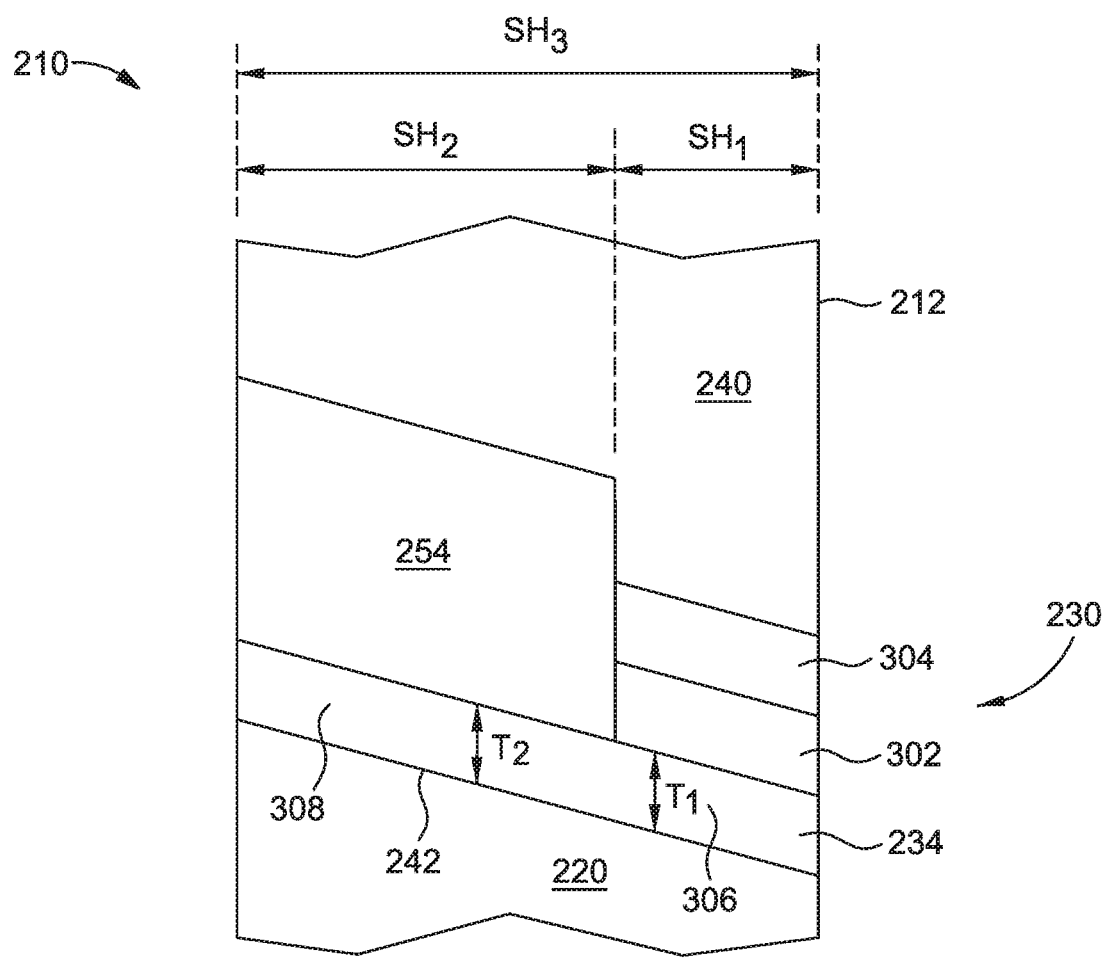
FIG. 3 is a cross sectional side view of the portion of the write head of FIG. 2 according to one embodiment disclosed herein.

FIG. 3 is a cross sectional side view of a portion of a write head 210 according to one embodiment. As shown in FIG. 3, the write head 210 includes the trailing shield 240, the MAMR stack 230, the dielectric material 254, and the main pole 220. In some embodiments, the trailing shield hot seed layer 241 (not shown) may be coupled to the trailing shield 240 (FIG. 2). The main pole 220 and the trailing shield 240 are disposed at the MFS 212. The MAMR stack 230 is disposed between the main pole 220 and the trailing shield 240 at the MFS 212. The dielectric material 254 is disposed between the main pole 220 and the trailing shield 240 at a location recessed from the MFS 212. The main pole 220 includes the trailing taper 242 in contact with the MAMR stack 230. In one embodiment, as shown in FIG. 3, the MAMR stack 230 includes the seed layer 234, a magnetic layer 302, and a spacer layer 304. The magnetic layer 302 may be a STL and may be NiFe, CoMnGe, or CoFe. The spacer layer 304 may be fabricated from a material such as Cu or AgSn.

The seed layer 234 includes a first portion 306 and a second portion 308. The first portion 306 has a stripe height $SH_1$, the second portion 308 has a stripe height $SH_2$, and the seed layer 234 has a stripe height $SH_3$. The stripe height $SH_3$ equals the stripe height $SH_1$ plus the stripe height $SH_2$. The magnetic layer 302 or the spacer layer 304 has the same stripe height $SH_1$. Thus, the stripe height $SH_3$ of the seed layer 234 is greater than the stripe height $SH_1$ of the magnetic layer 302 or the spacer layer 304. The stripe heights $SH_1$, $SH_2$ and $SH_3$ are measured by perpendicular distances between ends of the layer or portion of the layer. In one embodiment, the stripe height $SH_1$ ranges from about 40 nm to about 100 nm, the stripe height $SH_2$ ranges from about 5 nm to about one or more microns. Because the second portion 308 of the seed layer 234 has electrical resistivity lower than that of the main pole 220, the bias current from the trailing shield flows through the second portion 308 of the seed layer 234 before flowing into the main pole 220, effectively reducing the current crowding at the MAMR stack 230 and the total device resistance. In addition, temperature rise at or near the MAMR stack 230 is reduced, leading to improved head reliability and lifetime. In some embodiments, the second portion 308 is fabricated from a material different than the material of the first portion 306 of the seed layer 234.

The first portion 306 of the seed layer 234 is disposed between the main pole 220 at the MFS 212 and the magnetic layer 302. The second portion 308 of the seed layer 234 is disposed between the main pole 220 at a location recessed from the MFS 212 and the dielectric material 254. In one embodiment, the first portion 306 and the second portion of the seed layer 234 are disposed on the main pole 220, the magnetic layer 302 is disposed on the first portion 306 of the seed layer 234, and the dielectric material 254 is disposed on the second portion 308. The dielectric material 254 is adjacent the magnetic layer 302 and the spacer layer 304. The dielectric material 254 is in contact with the trailing shield 240.

The first portion 306 of the seed layer 234 has a thickness $T_1$, and the second portion 308 of the seed layer 234 has a thickness $T_2$. In one embodiment, the thickness $T_1$ is the same as the thickness $T_2$. In another embodiment, the thickness $T_1$ is greater than the thickness $T_2$ due to over-etching of the material disposed on the second portion 308 of the seed layer 234.

Figure 4A:
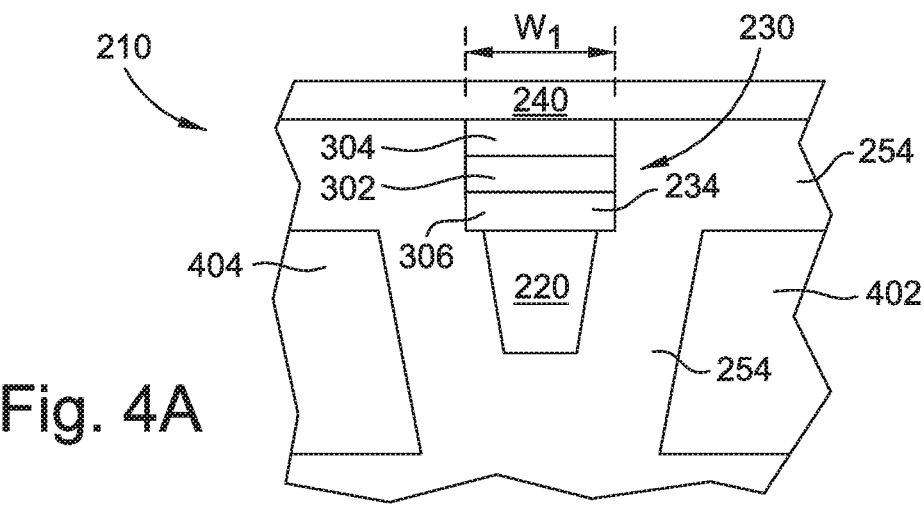
FIGS. 4A-4C are MFS views of the portion of the write head of FIG. 2 according to embodiments disclosed herein.
Figure 4B:
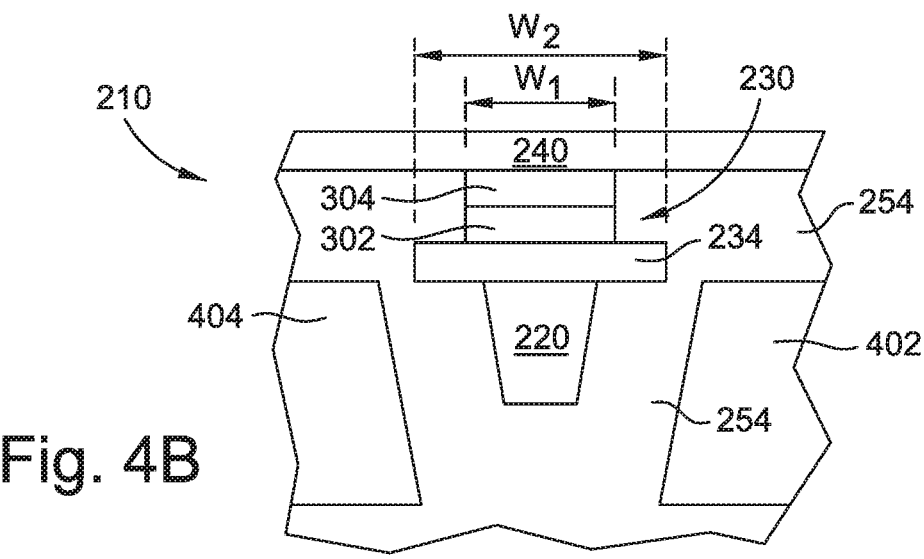
Figure 4C:
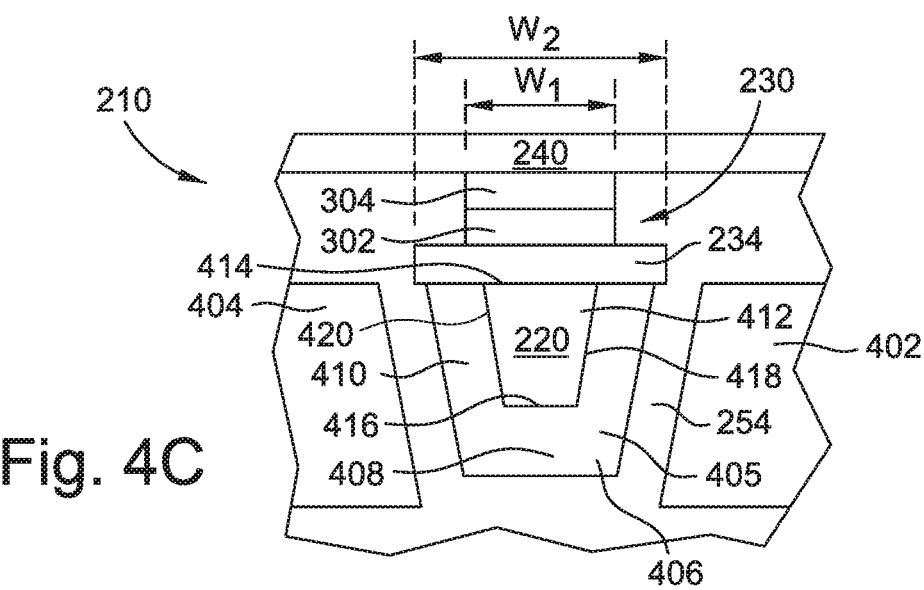

FIGS. 4A-4C are MFS views of the portion of the write head 210 of FIG. 2 according to embodiments disclosed herein. As shown in FIG. 4A, the write head 210 includes the trailing shield 240, the main pole 220, the MAMR stack 230 disposed between the trailing shield 240 and the main pole 220, and side shields 402, 404. The main pole 220 is disposed between the side shields 402, 404 in the cross track direction. The dielectric material 254 is disposed between the trailing shield 240 and the side shields 402, 404 and between the main pole 220 and the side shields 402, 404. The MAMR stack 230 includes the seed layer 234, the magnetic layer 302, and the spacer layer 304. As shown in FIG. 4A, the MAMR stack 230 has a uniform width $W_1$ in the cross track direction. In other words, the seed layer 234, the magnetic layer 302, and the spacer layer 304 all have the width $W_1$. The seed layer 234 includes the first portion 306 at the MFS 212 and the second portion 308 (FIG. 3) recessed from the MFS 212.

As shown in FIG. 4B, the write head 210 includes the trailing shield 240, the main pole 220, the MAMR stack 230 disposed between the trailing shield 240 and the main pole 220, and side shields 402, 404. The MAMR stack 230 includes the seed layer 234, the magnetic layer 302, and the spacer layer 304. As shown in FIG. 4B, the magnetic layer 302 and the spacer layer 304 each have the width $W_1$ in the cross track direction, and the seed layer 234 has a width $W_2$ in the cross track direction. In one embodiment, the width $W_2$ is greater than the width $W_1$, and the seed layer 234 laterally extends beyond the width $W_1$ of the magnetic layer 302. The laterally extended seed layer 234 can also effectively reduce the current crowding at the MAMR stack 230 and the total device resistance. With the laterally extended seed layer 234, the second portion 308 (FIG. 3) recessed from the MFS 212 may or may not be present.

As shown in FIG. 4C, the write head 210 includes the trailing shield 240, the main pole 220, the MAMR stack 230 disposed between the trailing shield 240 and the main pole 220, and side shields 402, 404. The MAMR stack 230 includes the seed layer 234, the magnetic layer 302, and the spacer layer 304. As shown in FIG. 4C, the magnetic layer 302 and the spacer layer 304 each have a width $W_1$ in the cross track direction, and the seed layer 234 has a width $W_2$ in the cross track direction. In one embodiment, the width $W_2$ is greater than the width $W_1$, and the seed layer 234 laterally extends beyond the width $W_1$ of the magnetic layer 302. A metal side gap 405 surrounds the main pole 220 at the MFS 212. The metal side gap 405 includes a first portion 406, a second portion 408, and a third portion 410. The main pole 220 includes a first surface 412 disposed at the MFS 212, a second surface 414 connected to the first surface 412, a third surface 416 opposite the second surface 414, a fourth surface 418 connecting the second surface 414 and the third surface 416, and a fifth surface 420 opposite the fourth surface 418. The seed layer 234 is disposed on the second surface 414 of the main pole 220. The first portion 406 of the metal side gap 405 is disposed between the fourth surface 418 of the main pole 220 and the side shield 402, the second portion 408 of the metal side gap 405 is disposed between the third surface 416 of the main pole 220 and the leading shield 206 (FIG. 2), and the third portion 410 of the metal side gap 405 is disposed between the fifth surface 420 of the main pole 220 and the side shield 404. The first portion 406 of the metal side gap 405 and the third portion 410 of the metal side gap 405 are in contact with the seed layer 234. Because the metal side gap 405 are fabricated from a metal, which is thermally conductive, dissipating of heat generated at or near the MAMR stack 230 is increased. With the laterally extended seed layer 234, the second portion 308 (FIG. 3) recessed from the MFS 212 may or may not be present.

Figure 5A:
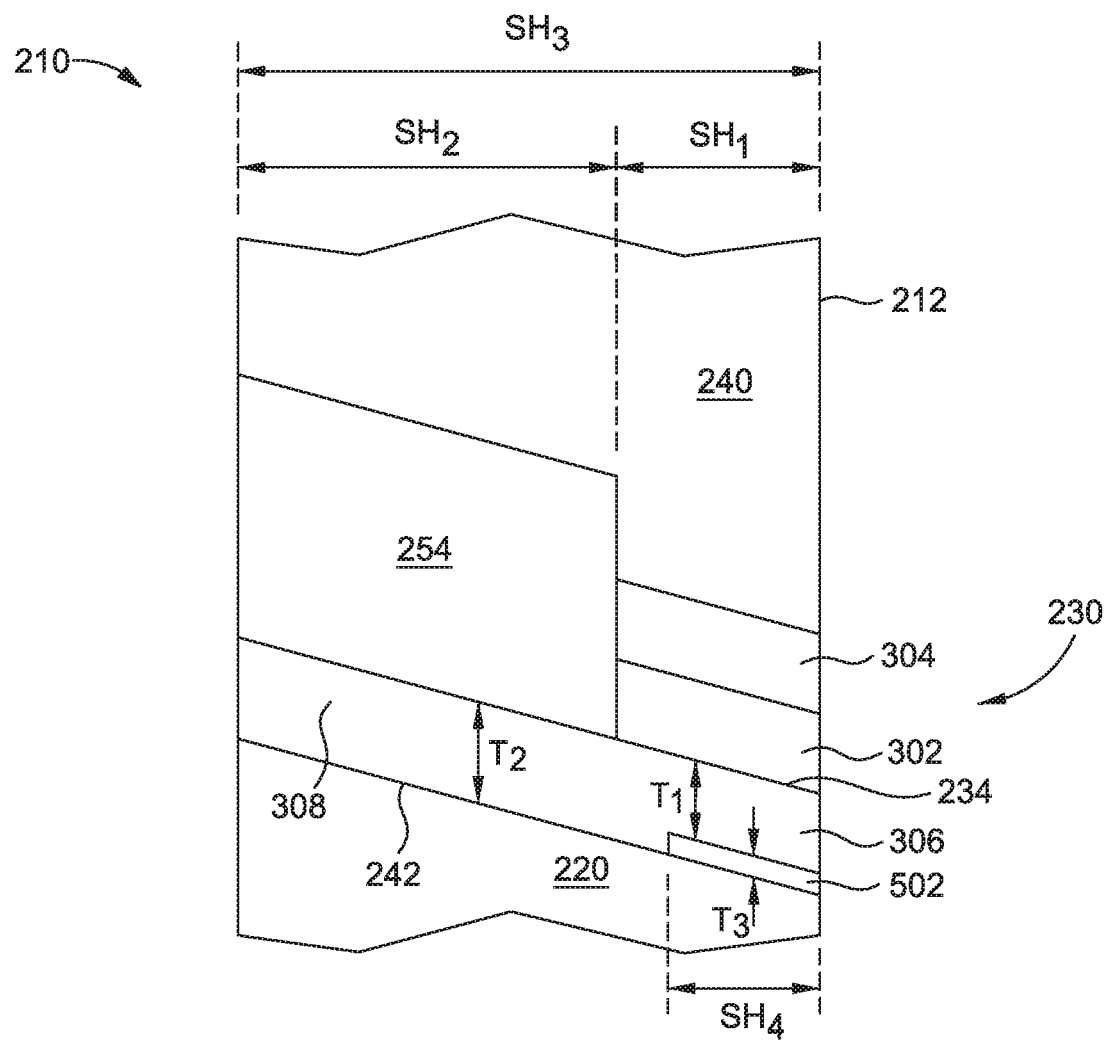
FIG. 5A is a cross sectional side view of the portion of the write head according to another embodiment disclosed herein.

In some embodiments, the temperature of the main pole 220 at the MFS 212 is reduced by placing a current blocking layer between a portion of the MAMR stack 230 and the main pole 220 at the MFS 212. FIG. 5A is a cross sectional side view of the portion of the write head 210 according to another embodiment disclosed herein. As shown in FIG. 5A, the write head 210 includes the trailing shield 240, the MAMR stack 230, the main pole 220, and current blocking layer 502 disposed between the MAMR stack 230 and the main pole 220. In some embodiments, the trailing shield hot seed layer 241 (not shown) may be coupled to the trailing shield 240 (FIG. 2). The main pole 220 and the current blocking layer 502 are disposed at the MFS 212. The main pole 220 includes the trailing taper 242 in contact with the current blocking layer 502 at the MFS 212 and the MAMR stack 230 at a location recessed from the MFS 212. The current blocking layer 502 is fabricated from a material having substantially higher electrical resistivity than that of the main pole 220. The current blocking layer 502 may be fabricated from $MgO$, $AlO_x$, $TaO_x$, or $SiN$. The thickness $T_3$ of the current blocking layer 502 is no greater than 3 nm. The current blocking layer 502 may block or minimize the bias current flowing to the main pole 220 at the MFS 212, which in turn lowers the temperature of the main pole 220 at the MFS 212, leading to improved write head reliability and lifetime.

In one embodiment, as shown in FIG. 5A, the MAMR stack 230 includes the seed layer 234, the magnetic layer 302, and the spacer layer 304. The seed layer 234 includes the first portion 306. The current blocking layer 502 is in contact with a portion of the first portion 306 of the seed layer 234. In one embodiment, the seed layer 234 includes the second portion 308, as shown in FIG. 5A to further direct the flow of the bias current away from the MFS 212. The thickness $T_2$ of the second portion 308 of the seed layer 234 may be equal to or greater than the thickness $T_1$ of the first portion 306 of the seed layer 234. In another embodiment, the seed layer 234 does not include the second portion 308, and the MAMR stack 230 has a uniform stripe height $SH_1$. In one embodiment, the first portion 306 of the seed layer 234, the magnetic layer 302, and the spacer layer 304 all have the stripe height $SH_1$. The current blocking layer 502 has a stripe height $SH_4$. The stripe height $SH_4$ is about 15 percent to about 85 percent of the stripe height $SH_1$. In one embodiment, the stripe height $SH_1$ ranges from about 40 nm to about 100 nm, and the stripe height $SH_4$ ranges from about 20 nm to about 80 nm.

Figure 5B:
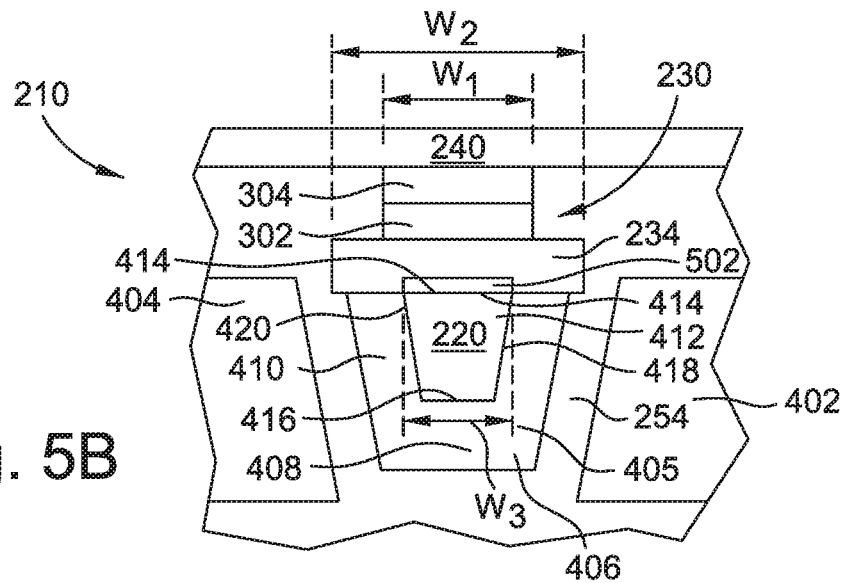
FIG. 5B is a MFS view of the portion of the write head according to another embodiment disclosed herein.

FIG. 5B is a MFS view of the portion of the write head 210 according to another embodiment disclosed herein. As shown in FIG. 5B, the write head 210 includes the trailing shield 240, the main pole 220, the MAMR stack 230 disposed between the trailing shield 240 and the main pole 220, the current blocking layer 502 disposed between the MAMR stack 230 and the main pole 220, and the side shields 402, 404. The metal side gap 405 surrounds the main pole 220 at the MFS 212. The MAMR stack 230 includes the seed layer 234, the magnetic layer 302, and the spacer layer 304. The current blocking layer 502 is disposed at the MFS 212 between the seed layer 234 of the MAMR stack 230 and the second surface 414 of the main pole 220. In one embodiment, as shown in FIG. 5B, the magnetic layer 302 and the spacer layer 304 each have the width $W_1$ in the cross track direction, the seed layer 234 has the width $W_2$ in the cross track direction, and the current blocking layer 502 has a width $W_2$ in the cross track direction. In one embodiment, the width $W_2$ is greater than the width $W_1$, the width $W_1$ is greater than the width $W_3$. With the combination of the current blocking layer 502, the laterally extended seed layer 234, and the metal side gap 405, the bias current flows into the metal side gap 405 instead of into the main pole 220. In another embodiment, the width $W_2$ is the same as the width $W_1$, and the width $W_3$ is smaller than widths $W_1$, $W_2$. With the laterally extended seed layer 234, the second portion 308 (FIG. 3) recessed from the MFS 212 may or may not be present.

Figure 6:
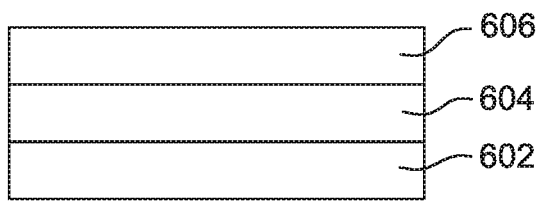
FIG. 6 is a cross sectional view of a seed layer stack according to one embodiment disclosed herein.

FIG. 6 is a cross sectional view of a seed layer stack 600 according to one embodiment disclosed herein. The seed layer stack 600 may replace the seed layer 234 shown in FIGS. 2, 3, 4A-4C, 5A and 5B. The seed layer stack 600 includes more than one layer, such as two, three or more layers. As shown in FIG. 6, the seed layer stack 600 includes a first layer 602, a second layer 604, and a third layer 606. Each of the first layer 602, second layer 604, and third layer 606 is fabricated from Cu, Pt, Au, Ag, Sn, Ru, Cr, W, Mo, Ir, or Rh, which has lower electrical resistivity than that of Ta. In one embodiment, the first layer 602 is fabricated from Cu, the second layer 604 comprises W or Cr, and the third layer 606 comprises Ru.

The benefits of having a MAMR stack including an extended seed layer having greater stripe height and/or greater width than the rest of the layers of the MAMR stack include reducing temperature rise at or near the MAMR stack since the bias current is directed away from the MFS. The temperature of the main pole can be further reduced by including a current blocking layer between the main pole and the MAMR stack, which further blocks the bias current from flowing into the main pole at the MFS. With less or no current flowing to the main pole at the MFS, the temperature of the main pole is reduced, leading to improved write head reliability and lifetime.

In one example embodiment, a magnetic recording head, comprising a main pole, a trailing shield; and a stack disposed between the main pole and the trailing shield, wherein the stack includes a seed layer having a first stripe height and at least one magnetic layer having a second stripe height, and wherein the first stripe height is greater than the second stripe height.

In one example embodiment, the magnetic recording head may be provided wherein the first stripe height is at least 5 nm greater than the second stripe height.

In another non-limiting embodiment, the magnetic recording head may be provided wherein the seed layer has a lower electrical resistivity than that of the main pole.

In another non-limiting embodiment, the magnetic recording head may be provided wherein the seed layer comprises non-magnetic metal.

In another non-limiting embodiment, the magnetic recording head may be provided wherein the seed layer comprises copper (Cu), chromium (Cr), ruthenium (Ru), tungsten (W), gold (Au), silver (Ag), tin (Sn), molybdenum (Mo), iridium (Ir), platinum (Pt), or rhodium (Rh).

In another non-limiting embodiment, a magnetic recording head is disclosed comprising a main pole, a trailing shield, a stack disposed between the main pole and the trailing shield, wherein the stack comprises: a seed layer having a first portion and a second portion, and at least one magnetic layer disposed on the first portion; and a dielectric material disposed on the second portion of the seed layer.

In another non-limiting embodiment, the magnetic recording head may be provided wherein the first portion of the seed layer and the second portion of the seed layer comprise a same material.

In another non-limiting embodiment, the magnetic recording head may be provided wherein the first portion of the seed layer and the second portion of the seed layer comprise different materials.

In a still further non-limiting embodiment, the magnetic recording head may be provided wherein the at least one magnetic layer has a first stripe height, the first portion of the seed layer has a second stripe height, the second portion of the seed layer has a third stripe height, and the seed layer has a fourth stripe height.

In another non-limiting embodiment, the magnetic recording head may be provided wherein the first stripe height is the same as the second stripe height.

In another non-limiting embodiment, the magnetic recording head may be configured wherein the fourth stripe height equals a sum of the second stripe height and the third stripe height.

In a still further non-limiting embodiment, the magnetic recording head may be configured wherein the third stripe height is 5 nm or greater.

In another non-limiting embodiment, the magnetic recording head may be configured wherein the dielectric material is in contact with the at least one magnetic layer.

In another non-limiting embodiment, a data storage device is disclosed comprising a magnetic write head, comprising a trailing shield, a main pole, a stack disposed between the main pole and the trailing shield, wherein the stack includes a magnetic layer having a first stripe height and a current blocking layer disposed between the stack and the main pole at a media facing surface, wherein the current blocking layer has a second stripe height less than the first stripe height.

In another non-limiting embodiment, the data storage device may be configured wherein the second stripe height is about 15 percent to about 85 percent of the first stripe height.

In another non-limiting embodiment, the data storage device may be configured wherein the current blocking layer has a thickness of 3 nm or less.

In another non-limiting embodiment, the data storage device may be configured wherein the current blocking layer comprises MgO, $AlO_x$, $TaO_x$, or SiN.

In another example embodiment, the data storage device may further comprise a seed layer having a third stripe height, wherein the third stripe height is greater than first stripe height.

In one example embodiment, a magnetic recording head is disclosed comprising a main pole, a stack coupled to the main pole and means for directing a bias current away from the main pole at a media facing surface.

In another non-limiting embodiment, the magnetic recording head may be configured wherein the means for directing the bias current away from the main pole at the media facing surface is located between the main pole and the stack.

In another non-limiting embodiment, a magnetic recording head is disclosed comprising a main pole, a trailing shield; and a stack disposed between the main pole and the trailing shield, wherein the stack includes a seed layer having a first stripe height and at least one magnetic layer having a second stripe height, and wherein the first stripe height is equal to the second stripe height.

In another non-limiting embodiment, the magnetic recording head may be configured wherein the seed layer has a lower electrical resistivity than that of the main pole.

In another non-limiting embodiment, the magnetic recording head may be configured wherein the seed layer comprises non-magnetic metal.

In another non-limiting embodiment, the magnetic recording head may be configured wherein the seed layer comprises at least one of copper, chromium, gold, silver and platinum.

In another non-limiting embodiment, the magnetic recording head may be configured wherein the seed layer comprises at least one of chromium, ruthenium, tungsten, tin, molybdenum, iridium and rhodium.

While the foregoing is directed to embodiments of the present disclosure, other and further embodiments of the disclosure may be devised without departing from the basic scope thereof, and the scope thereof is determined by the claims that follow.

The invention claimed is:

1. A data storage device, comprising:
a magnetic write head, comprising:
  a trailing shield;
  a main pole;
  a microwave assisted magnetic recording (MAMR) stack disposed between the main pole and the trailing shield, wherein the MAMR stack includes a magnetic layer having a first stripe height; and
  a current blocking layer disposed between the MAMR stack and the main pole, wherein the current blocking layer has a second stripe height less than the first stripe height, wherein the main pole, the MAMR stack, and the current blocking layer form a common media facing surface.

2. The data storage device of claim 1, wherein the second stripe height is about 15 percent to about 85 percent of the first stripe height.

3. The data storage device of claim 1, wherein the current blocking layer has a thickness of 3 nm or less.

4. The data storage device of claim 1, wherein the current blocking layer comprises MgO, $AlO_x$, $TaO_x$, or SiN.

5. A data storage device, comprising:
a magnetic write head, comprising:
  a trailing shield;
  a main pole;

a stack disposed between the main pole and the trailing shield, wherein the stack includes a magnetic layer having a first stripe height; and a current blocking layer disposed between the stack and the main pole at a media facing surface, wherein the current blocking layer has a second stripe height less than the first stripe height, wherein the stack further comprises seed layer having a third stripe height, wherein the third stripe height is greater than the first stripe height.

6. A magnetic recording head, comprising:

a main pole;

a trailing shield;

a microwave assisted magnetic recording (MAMR) stack disposed between the main pole and the trailing shield, wherein the MAMR stack comprises:

a seed layer having a first portion extending to a media facing surface and a second portion extending away from the media facing surface; and at least one magnetic layer disposed on the first portion;

a currently blocking layer disposed between the first portion of the seed layer and the main pole; and a dielectric material disposed on the second portion of the seed layer.

7. The magnetic recording head of claim 6, wherein the first portion of the seed layer and the second portion of the seed layer comprise a same material.

8. The magnetic recording head of claim 6, wherein the first portion of the seed layer and the second portion of the seed layer comprise different materials.

9. The magnetic recording head of claim 6, wherein the at least one magnetic layer has a first stripe height, the first portion of the seed layer has a second stripe height, the second portion of the seed layer has a third stripe height, and the seed layer has a fourth stripe height.

10. The magnetic recording head of claim 9, wherein the first stripe height is the same as the second stripe height.

11. The magnetic recording head of claim 10, wherein the fourth stripe height equals a sum of the second stripe height and the third stripe height.

12. The magnetic recording head of claim 11, wherein the third stripe height is 5 nm or greater.

13. The magnetic recording head of claim 6, wherein the dielectric material is in contact with the at least one magnetic layer.

14. A magnetic media drive, comprising the magnetic recording head of claim 6.

15. A magnetic recording head, comprising:

a main pole;

a microwave assisted magnetic recording stack coupled to the main pole; and means for directing a bias current away from the main pole at a media facing surface, wherein the means for directing the bias current away from the main pole at the media facing surface is located between the main pole and the stack, wherein the main pole, the microwave assisted magnetic recording stack, and the means for directing the bias current form a common media facing surface.

16. A magnetic media drive, comprising the magnetic recording head of claim 15.

* * * * *